United States Patent [19]

Yoshida

[11] Patent Number: 5,172,246
[45] Date of Patent: Dec. 15, 1992

[54] IMAGE COMMUNICATION METHOD AND APPARATUS

[75] Inventor: Takehiro Yoshida, Tokyo, Japan

[73] Assignee: Canon Kabushiki Kaisha, Tokyo, Japan

[21] Appl. No.: 458,458

[22] Filed: Dec. 28, 1989

[30] Foreign Application Priority Data

Dec. 29, 1988 [JP] Japan ................. 63-331182

[51] Int. Cl.$^5$ .............................................. H04N 1/00
[52] U.S. Cl. .................................... 358/406; 358/405; 358/434; 358/439
[58] Field of Search ............... 358/405, 406, 434, 435, 358/436, 437, 438, 439; 371/32, 33

[56] References Cited

U.S. PATENT DOCUMENTS

| | | | |
|---|---|---|---|
| 3,340,505 | 9/1967 | Scott | 371/32 |
| 3,456,239 | 7/1969 | Glasson | 371/32 |
| 4,422,171 | 12/1983 | Wortley et al. | 371/32 |
| 4,803,685 | 2/1989 | Oget | 371/33 |
| 4,829,524 | 5/1989 | Yoshida | 371/32 |
| 5,041,917 | 8/1991 | Koshiishi | 358/434 |
| 5,057,938 | 10/1991 | Edamura | 358/434 |

FOREIGN PATENT DOCUMENTS 61-6982  1/1986  Japan .................. 358/405

Primary Examiner—Edward L. Coles, Sr.
Assistant Examiner—Thomas D. Lee
Attorney, Agent, or Firm—Fitzpatrick, Cella, Harper & Scinto

[57] ABSTRACT

An image communication method and apparatus use full duplex communication, wherein a receiving station sends position data designating where an error has been detected to a transmitting station via a backward channel while receiving the image data. The transmitting station continues to transmit current image data which is being sent when the position data is received and then retransmits the image data designated by the position data.

14 Claims, 8 Drawing Sheets

FIG. 3 (2)

IMAGE COMMUNICATION METHOD AND APPARATUS

FIELD OF THE INVENTION

This invention relates generally to an image communication method and apparatus which are capable of full duplex communication. This invention, more specifically, relates to an image communication method suitable for a facsimile apparatus, or to the apparatus itself, which communicates image information converted to HDLC format, and has an error correction function for full duplex communication.

BACKGROUND OF THE INVENTION

A facsimile apparatus which sends image data converted to HDLC format and has an error correction function using full duplex communication is known as follows.

A transmitting station converts encoded image data to HDLC format for every predetermined number of bytes, e.g., 512 bytes, 256 bytes, 64 bytes, etc. and sends converted image data to a receiving station. Each group of data of every predetermined number of bytes is called a frame of data. Each frame has an identification (ID) number, for example a module of three bits used as the ID number. Therefore, each frame has as its ID number one of the numbers 0 through 7. If the communication system has a long delay time or if a data amount of each frame is small, the number of bits for the module increases. For example, a module of eight bits is then used, and each frame has one of the ID numbers 0 through 255.

The receiving station checks the CRC and checks the continuity of frame numbers showing that frames have been received correctly. The receiving apparatus returns a signal NACK, which is a tonal signal having a predetermined band width which is outside of that of the image signal, or the like to the transmitting station when the receiving station detects any errors.

When the transmitting station receives and detects the signal NACK, the transmitting station stops sending image data.

The receiving apparatus sends the ID number of an error frame in which any errors occurred with a FSK signal of 300 bits per second to the transmitting station, and the transmitting station resends image data of the error frame designated by the receiving apparatus.

In the above-mentioned error correction, however, the transmitting station has to stop transmission every time the receiving station detects any error, and has to resend image data from the frame in which the error occurred, so that when an error occurs frequently it takes a long time to send image data.

Avoiding this problem, a half duplex communication method has been proposed which has an error correction function sending image data converted to HDLC format. This method operates as follows.

Image data having a plurality of frames is provided as one block, and both a transmitting station and a receiving station store the image data of each block. After the receiving station receives a procedure signal showing a completion of sending one block, the receiving station returns the ID numbers of the error frames in which errors occurred as a request signal for retransmission. The transmitting station retransmits the image data corresponding to the error frames in response to the request signal for retransmission.

In this method, however, using the half duplex communication method, after the completion of sending one block of image data, the receiving station informs the transmitting station of the ID numbers of error frames by a procedure signal which is relatively slow, and the transmitting station sends the image data again. Therefore, even if there is only one error frame, it takes three seconds to send the procedure signal and it takes one second for retransmission. Thus the total transmission time is longer even though there is only one error frame.

SUMMARY OF THE INVENTION

A purpose of this invention is to provide an image communication method and apparatus which require less time for retransmission by using full duplex communication.

One aspect of the present invention is to provide an image communication method using full duplex communication, wherein a receiving station sends position data designating where an error has occurred to a transmitting station via a backward channel, the transmitting station continues to transmit the current image data which is being sent when the position data is received, and the transmitting station retransmits the image data designated by the position data.

Another aspect of the present invention is to provide an image transmitting/receiving apparatus to which can be applied the above mentioned image communicating method.

The foregoing summary of certain advantageous features of the invention is provided in order that the following detailed description of the preferred embodiments thereof may be better understood, and in order that the present contribution to the art may be better appreciated. There are, of course, additional features of the invention that will be described in that detailed description with reference to the accompanying drawings. Those skilled in the art will appreciate that the conception upon which this disclosure is based may readily be utilized as a basis for designing other structures or methods for carrying out the purposes of the invention. It will be understood that the claims are to be regarded as including such other constructions and methods as do not depart from the scope of the invention.

BRIEF DESCRIPTION OF THE DRAWINGS

FIGS. 3 (1) through (4) are flowcharts illustrating a control program which a control circuit in FIG. 2 carries out.

DETAILED DESCRIPTION OF THE PREFERRED EMBODIMENTS

Figure 1:
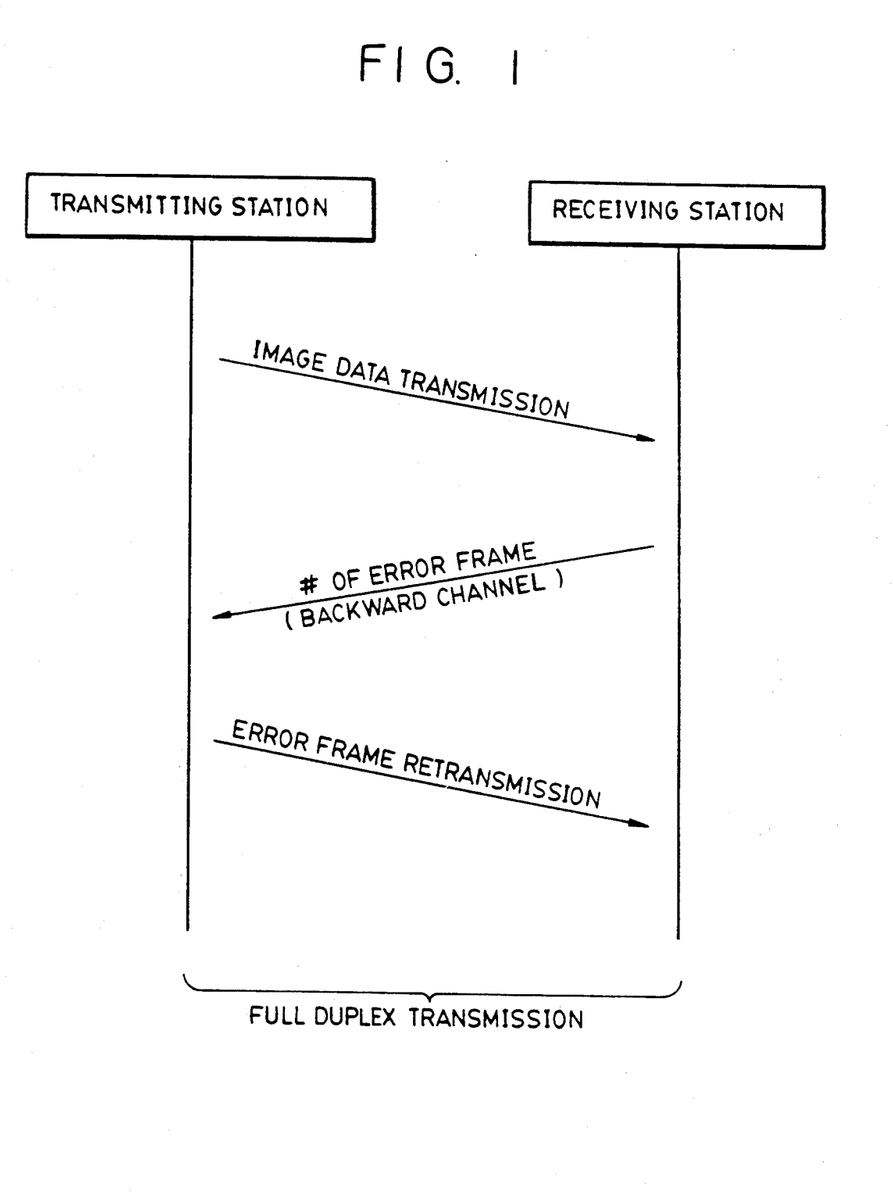
FIG. 1 shows an image communication method of an embodiment of this invention.

In FIG. 1, an image communication method having an error correction mode is shown, and this method embodies the present invention. This method is carried out in the full duplex communication mode, and a receiving station sends information designating the error frame to a transmitting station via a backward channel while receiving image data. The transmitting station retransmits image data of the error frame without interrupting the sending operation of the current image data.

Embodiment 1

Figure 2:
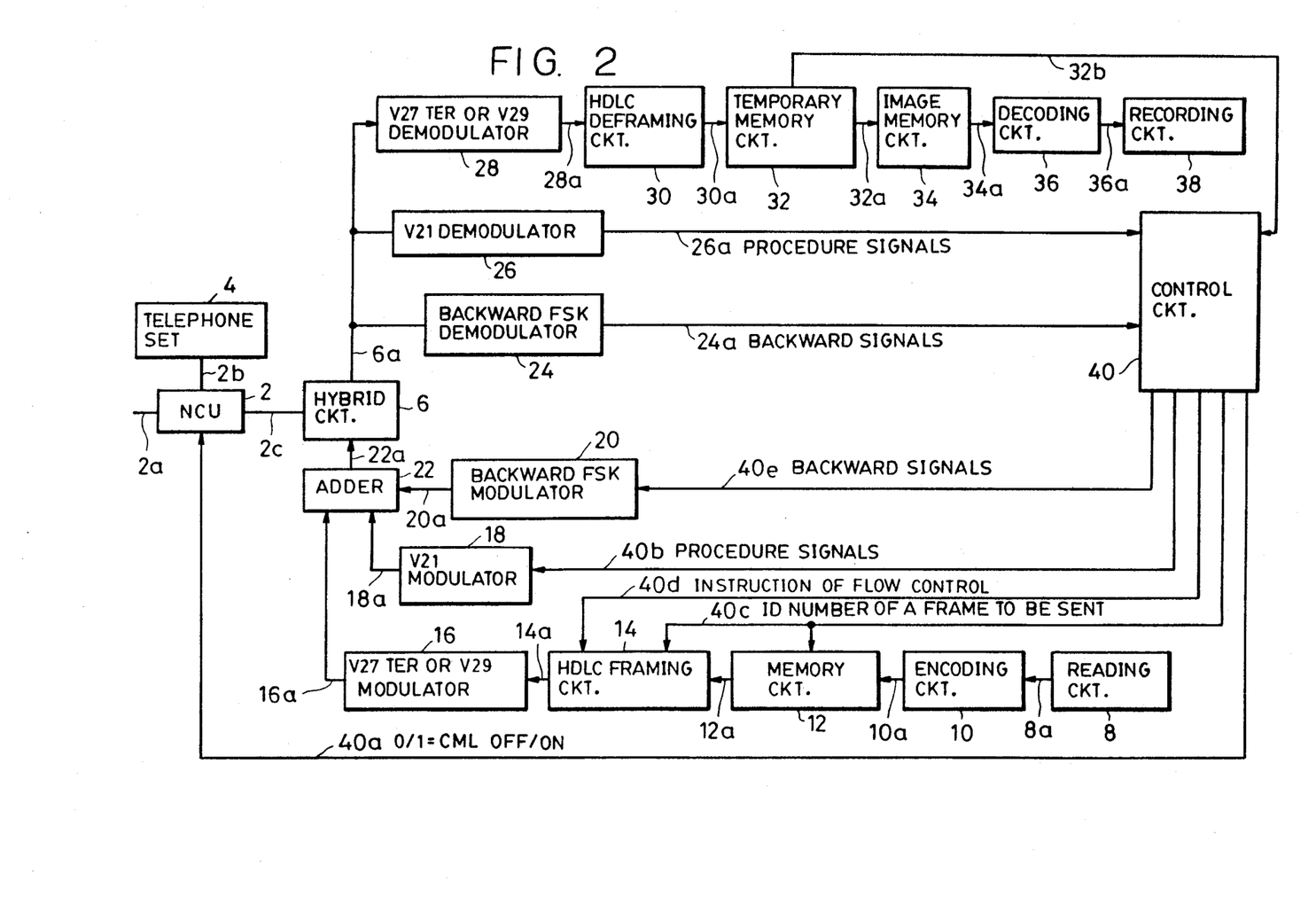
FIG. 2 is a block diagram of a facsimile apparatus to which the embodiment of this invention is applied.
Figures 3, 3I:
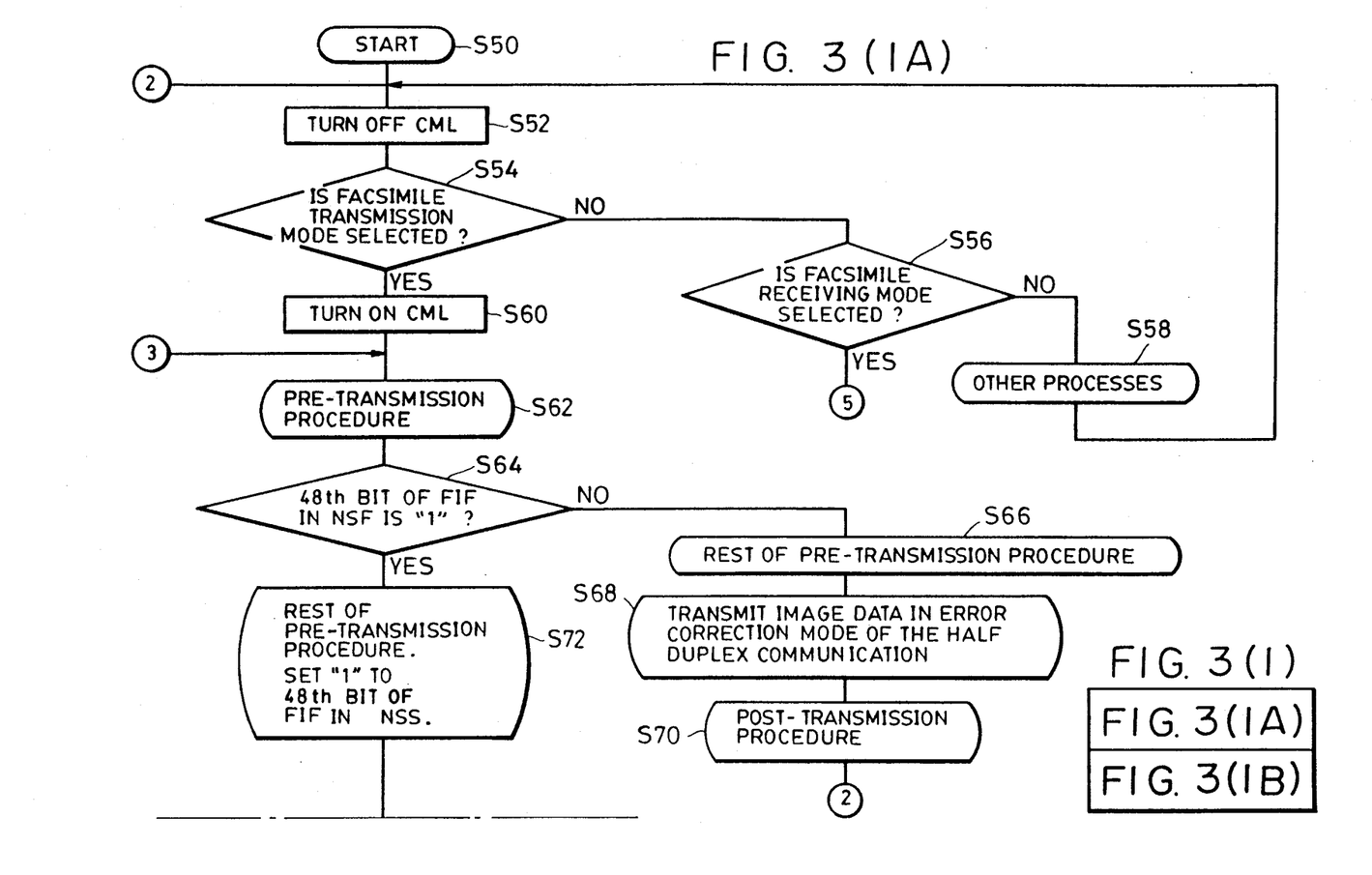
Figure 3:
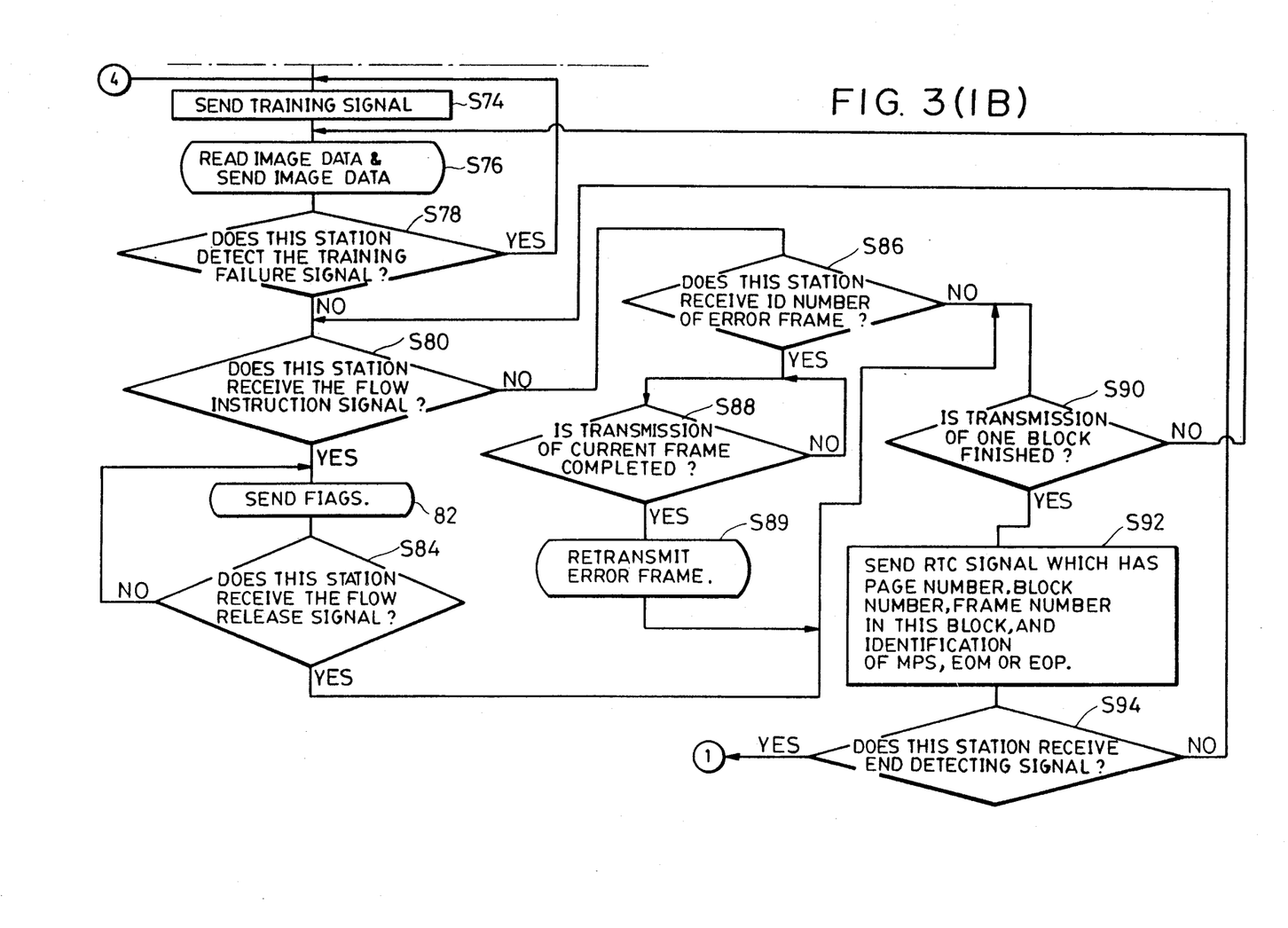

FIG. 2 shows a block diagram of a facsimile apparatus which can operate the image communication method of the present invention.

The facsimile apparatus of FIG. 2 includes an NCU (Network Control Unit) 2 for connecting a terminal to a telephone network, for changing connection to data communication from speech communication and for holding a closed loop to use the telephone network for data communication.

The NCU 2 receives a signal from a signal line 40a, and if the signal of the line 40a is "0" the NCU 2 connects a telephone line 2a to a telephone set 4 by connecting the telephone line 2a to a line 2b. On the other hand, if the signal of the line 40a is "1", the NCU 2 connects the telephone line 2a to a facsimile apparatus by connecting the line 2a to a line 2c. In a normal condition or a standby state, the line 2a is connected to the telephone set 4 via the line 2b.

The facsimile apparatus also includes a hybrid circuit 6 for separating signals for transmission from received signals. The signals for transmission on a signal line 22a are sent to the telephone line 2a via the line 2c and the NCU 2. The received signals from the other station are sent to a line 6a via the NCU 2 and the line 2c.

A reading circuit 8 is also provided for reading image data from originals to be sent, for each line sequentially and making a binary signal showing binary values of white and black. This reading circuit 8 is structured with an imaging device such as a CCD (Charge Coupled Device), an optical system and a signal processing circuit for binarizing a signal from the imaging device, and the binary signal showing binary values of white and black is output to a signal line 8a.

An encoding circuit 10 is provided for receiving the binary signal on the line 8a, for encoding the binary signal to an MH (Modified Huffman) code signal or to an MR (Modified READ) code signal, and for outputting the code signal to a line 10a.

A memory circuit 12 is provided for storing the code signal on the line 10a. The facsimile apparatus retransmits image data of error frames of each block while image data of each block is sent, so that the facsimile apparatus has a memory able to store image data corresponding to at least one block. The memory circuit 12 stores one block of image data and outputs image data of a frame to a line 12a when an ID number of a frame to be sent is designated by a signal on a line 40c.

An HDLC framing circuit 14 is also provided for adding an address field signal, a control field signal, a facsimile control field (FCF) signal and a facsimile information field (FIF) signal having the ID number of frame sent currently to the code signal from the line 12a, and for outputting an HDLC format signal to a line 14a. Further, the HDLC framing circuit 14 sends a series of flags to the line 14a and carries out a flow control when a signal of a line 40d is "1" level.

A V27 ter or V29 modulator 16 is provided for modulating a transmission signal from the line 14a based on the V27 ter recommendation (Differential Phase Modulation) or the V29 recommendation (Quadrature Modulation), and for outputting modulated signals to a line 16a.

A V21 modulator 18 is also provided for modulating procedure signals from a line 40b based on the V21 recommendation and for outputting modulated procedure signals to a line 18a.

A backward FSK modulator 20 is provided for sending an FSK (Frequency Shift Keying) signal to the transmitting station over a backward channel by modulating backward signals from a line 40e and for outputting the FSK signal to a line 20a.

An adder 22 is provided for receiving and adding the signals of lines 16a, 18a and 20a, and for outputting an added signal to the line 22a.

A backward FSK demodulator 24 is provided for demodulating an FSK signal on a line 6a over the backward channel, and for outputting a demodulated FSK signal to a line 24a.

A V21 demodulator 26 is provided for demodulating a signal on the line 6a based on the V21 recommendation and for outputting demodulated data to a line 26a.

A V27 ter or V29 demodulator 28 is provided for demodulating a signal on the line 6a and for outputting demodulated data to a line 28a.

An HDLC deframing circuit 30 is provided for deframing the demodulated data on the line 28a by carrying out a zero delete operation to obtain image data as it was before HDLC conversion, and for outputting deframed image data to a line 30a.

A temporary memory circuit 32 is provided for temporarily storing deframed image data on the line 30a for each frame. The memory circuit 32 outputs image data which is correctly received for each frame to a line 32a, and the ID number showing such a frame received without errors is output to a line 32b.

An image memory circuit 34 is also provided for storing image data of each frame on the line 32a to a corresponding memory space in it and has a capacity to store one block of image data. The image memory circuit 34 sequentially outputs image data to a line 34a for a frame in which there have been no errors.

A decoding circuit 36 is provided for decoding demodulated data on the line 34a based on the MH or MR demodulation, and for outputting demodulated data to a line 36a.

A recording circuit 38 is also provided for recording image on a recording medium by recording each line sequentially with the decoded image data on the line 36a.

A control circuit 40 is provided for controlling the entire facsimile apparatus according to a program which is shown in FIGS. 3 (1) through 3 (4).

In FIG. 1, both the transmitting station and the receiving station are G3 facsimile apparatus having modulation/demodulation methods of both the V27 ter and V29 recommendations, and the backward channel signal is a 300 bits per second FSK signal which is transmitted in a frequency band outside of that of image data, e.g., 3300 Hz±20 Hz.

First of all, the receiving station assigns information showing whether the receiving station has the function of this embodiment to an NSF (Non-Standard Facility) signal, and sends the NSF signal. This information is allotted at the 48th bit of the FIF signal in the NSF signal. If the 48th bit of the FIF signal is "0", the apparatus does not have the function of this embodiment. But if it is "1", the apparatus has the function of this embodiment.

The transmitting station analyzes the 48th bit of the FIF signal, and discriminates whether the receiving station has the function of this embodiment or not.

If the receiving station does not have the function of this embodiment, both the transmitting station and the receiving station carry out a conventional error correction communication. In this case, the transmitting station allots "0" to 48th bit of the FIF signal in a NSS (Non-Standard Setting) signal, and sends the NSS signal to the receiving station to declare that the transmitting station will not carry out the function of this embodiment in this current communication.

On the other hand, if both the transmitting station and the receiving station have the function of this embodiment, they carry out the function of this embodiment. The transmitting station sets "1" at the 48th bit of the FIF signal in the NSS signal and sends the NSS signal to declare that the transmitting station will carry out the function of this embodiment in this current communication.

In this embodiment, it is assumed that both transmitting and receiving stations at least have an error correction mode of half duplex communication, and that the stations always select an error correction mode of either half duplex or full duplex communication, so that there is no operation discriminating whether an error correction mode is selected or not.

The error correction mode of full duplex communication is explained as follows, and in this mode image data is transmitted in the HDLC format.

A pre-transmission procedure is almost the same as that based on the conventional T30 recommendation of CCITT. The receiving station sends a CFR (Confirmation Signal to Receive) signal to the transmitting station when the receiving station receives a training/TCF (Training Check) signal. The transmitting station sends a training signal and image data which is converted to the HDLC format when the transmitting station receives the CFR signal. If the receiving station fails to receive the training signal the receiving station informs the transmitting station of the failure by sending a training failure signal through the backward channel. The transmitting station tries again to send the training signal and the image data when the transmitting station receives the training failure signal. Thereby, when the receiving station fails to receive the training signal for training the communication line, it is able to inform the transmitting station of the failure of the training immediately.

When the receiving station receives the training signal and the image data in the HDLC format, the receiving station continues to receive the image data in the HDLC format sequentially and discriminates whether the receiving station receives the image data correctly by the CRC checking sequence. If there are no errors, the receiving station decodes the received image data and records the decoded image data, sequentially. But if the receiving station detects any errors by the CRC checking sequence, the receiving station informs the transmitting station of the ID number of the error frame through the backward channel.

When the transmitting station receives the ID number of the error frame from the other station, the transmitting station retransmits the image data of the error frame identified by the other station immediately after finishing sending current image data of a current frame. After retransmission of the error frame, the transmitting station sends the next frame data of the frame which follows the current image data of the current frame. Thus, the transmitting station does not interrupt its sending of image data, and does not carry out a communication procedure which uses relatively slow procedure signals until one block is completely sent to the other station in a state with no errors. A condition for the transmitting station to discriminate that one block is completely sent to the other station in a state with no errors is mentioned later. The state with no errors means that there are no errors during the transmission of one block or that errors occurring during the transmission have been corrected.

The receiving station instructs the other station to carry out its flow control by sending a flow instruction signal through the backward channel when the transmission of the image data of one block is finished in the state with no errors and when the receiving station wants the other station to stop the transmission because the receiving station does not have enough time to record the received image data or the image memory circuit of the receiving station is almost filled with the image data.

The transmitting station continues to send a series of flags until the transmitting station receives a flow release signal to stop its flow control after the transmitting station receives the flow instruction signal. The receiving station sends the flow release signal and an end detecting signal, showing that the receiving station detects an end signal of a block to the other station via the backward channel, when the receiving station detects that its flow control becomes unnecessary. The transmitting station stops its flow control upon detecting the flow release signal. The receiving station informs the other station of the end detecting signal in the case that the receiving station receives image data in HDLC format including the end signal of the block, and that there are no errors and the receiving station does not require flow control. When the transmitting station detects the end detecting signal, the transmitting station goes to a communication procedure operation, and sends image data of the next block.

FIGS. 3 (1) through 3 (4) show flowcharts of programs which the control circuit 40 in FIG. 2 carries out. The flow starts from step S50. In step S52, the control circuit 40 turns off a CML (Connect Modem to Line) relay, i.e., the control circuit sets "0" to the line 40a, and the NCU2 connects the telephone line 2a to the line 2b which is connected to the telephone set 4. In step S54, the control circuit determines whether a facsimile transmission mode is selected or not. If it is, the flow advances to step S60, but if not, the flow advances to step S56.

In step S56, it is determined whether a facsimile receiving mode is selected or not. If it is, the flow advances to step S100 in FIG. 3 (3), but if the receiving mode is not selected the flow advances to step S58 to carry out other processes.

When, in step S54, the transmission mode is selected, the control circuit 40 turns on the CML relay, i.e., the control circuit 40 sets "1" on the line 40a to connect the telephone line 2a to the facsimile apparatus via the line 2c. In step S62, the circuit 40 carries out the pre-transmission procedure, and the control circuit 40 checks whether the other receiving station has the special function of this embodiment, i.e., the error correction mode of full duplex communication. In detail, the control circuit 40 checks whether the 48th bit of the FIF signal in the NSF signal from the other station is set to "1" or "0". If the other station has the special function and the 48th bit is set to "1", the flow advances to step S72. If the other station does not have the special function and the 48th bit is set to "0", the flow advances to step S66 to carry out the rest of the pre-transmission procedure and both stations communicate the image data in the error correction mode of half duplex communication. After the completion of the communication, the control circuit 40 executes a post-transmission procedure in step S70, and the flow returns to its initial state of step S52.

When the control circuit 40, in step S64, discriminates that the other station has the special function of this embodiment, the control circuit 40 sets "1" to the 48th bit of the FIF signal in the NSS signal to declare to the other station that this transmitting station operates in the error correction mode of full duplex communication in the rest of the pre-transmission procedure of step S72. The control circuit 40 causes sending of the training signal in step S74, the control circuit 40 causes the reading circuit 8 to read image data, and causes sending of the image data stored the memory circuit 12 following the training signal in step S76.

The control circuit 40 checks whether this transmitting station receives the training failure signal from the other station through the backward channel in step S78. If this station receives the training failure signal showing that the receiving station has failed to receive the training signal, the flow returns to step S74 to re-transmit the training signal again. If not, the flow advances to step S80 to discriminate whether the station receives the flow instruction signal instructing it to execute the flow control from the other station through the backward channel. If this station receives the flow instruction signal, the flow advances to step S82 where the control circuit 40 instructs the HDLC framing circuit to send the series of flags. If the station does not receive it the flow advances to step S86.

In step S84, it is discriminated whether this station receives the flow release signal instructing release of the flow control. If this station receives the flow release signal, the control circuit 40 stops sending the series of flags and the flow advances to step S90. But if this station has not received it the flow returns to step S82 to continue the flow control.

In step S86, the control circuit 40 checks whether this station receives an ID number of an error frame from the other receiving station via the backward channel, or not. If it does, the control circuit 40 continues to send the current frame data. After the completion of the transmission of the current frame data, the image data of the error frame are retransmitted in steps S88 and S89. If this station does not receive the ID number of the error frame, the flow advances to step S90 to discriminate whether the transmission of one block of image data is finished or not. If so, the flow advances to step S92, wherein the control circuit 40 causes the station to send a return to control (RTC) signal. In this embodiment, the RTC signal has a unique format of the FCF signal in the HDLC format, and the information in the FIF signal includes an MPS (Multipage Signal) signal showing that there are succeeding originals, an EOP (End of Procedure) signal showing that there is a mode change after this signal, and an EOM (End of Message) signal showing the end of the image data. These RTC signals show whether a next page is exited, and whether there is a mode change. These RTC signals also have a page number of the current block, a block number of the current block and a frame number showing how many frames are in the current block, wherein these numbers each have one subtracted therefrom respectively. The transmitting station sends this RTC signal in the HDLC format three times continuously, and when the receiving station detects one of them, the receiving station assumes that it detects the RTC signal.

In step S94, it is discriminated whether the end detecting signal is received showing the receiving station detects the end of the block from the receiving station through the backward channel. If it is received, the flow advances to step S96, but if it is not received the flow goes back to step S80.

In step S96, the control circuit 40 discriminates whether there is a next block to be sent. If there is, the flow advances to step S98, but if there is not the flow returns to the initial state of step S52.

In step S98, it is checked if there is a mode change. If there is, the flow returns to step S62 to execute the pre-transmission procedure again for determining a new mode. If there is no mode change, the flow returns to step S74 to start the image data transmission of the next block without the mode change.

Next, the operation in the image receiving mode is explained as follows, referring to FIGS. 3(3) and 3(4).

When the image receiving mode is set in step S56, the flow advances to step S100 to turn on the CML relay to connect the telephone line 2a to the line 2c by setting "1" to the line 40a.

In step S102, the control circuit 40 sets "1" to the 48th bit of the FIF signal in the NSF signal because this receiving station has the special function, i.e., the error correction mode of the full duplex communication.

In step S104, the receiving station checks whether the other station has the special function by checking the 48th bit of the FIF of the NSS signal. If the other station does, the flow advances to step S112 to carry out the rest of the pre-communication procedure. If it does not, the flow advances to step S106 to execute the rest of the pre-communication procedure wherein the error correction mode of half duplex communication is set. In step S108, both stations carry out image data communication in the error correction mode of half duplex communication. After the completion of the image data communication, the post-communication procedure is executed in step S110, and the flow returns to the initial state of step S52.

On the other hand, when the error correction mode of full duplex communication is selected in step S104, the flow advances to step S112 to carry out the rest of the pre-communication procedure, and in step S114 the receiving station receives the training signal. Further, in step S116 the receiving station receives image data, and the control circuit 40 causes the recording circuit 38 to record the image data of frames which are received without errors or whose errors have been corrected in step S118.

In detail, the image memory circuit 34, as mentioned before, stores image data of each frame which has been received correctly into a memory space of an address corresponding to the ID number of the frame. The image memory circuit 34 keeps vacant a memory space corresponding to the frame where an error has occurred, and stores next frame data into a next memory space corresponding to the next frame. Then, after the error frame is retransmitted and the error is corrected, the image memory circuit stores the image data of the error frame into the memory space which has been kept vacant. In other words, the receiving station can arrange the order of the image data into the normal order of the image data itself regardless of the order in which the transmitting station sends image data.

In step S120, it is discriminated whether the receiving station receives the training signal correctly. If it fails to receive the training signal, the receiving station sends the training failure signal to the other station via the backward channel, because the receiving station cannot receive image data without the training signal, in step S122. Then the flow returns to step S114 to receive the training signal again.

If the receiving station receives the training signal correctly, the flow advances to step S124, because the receiving station can receive the image data. In step S124, it is checked whether the RTC signal is detected or not. If it is detected, the flow advances to step S130, but if not the flow advances to step S126.

In step S126, the control circuit checks the continuity of ID numbers of the received frames and whether there are any error frames. If there are no error frames, the flow goes back to step S116 to continue the receiving operation. But if the control circuit detects the error frame, the flow advances to step S128 to send the ID number of the error frame to the other transmitting station via the backward channel, and returns to step S116 to continue to receive the image data. Even if the error frame is detected, the receiving station continues to receive the current image data.

When the receiving station detects the RTC signal in step S124, the control circuit 40 also checks error frames by checking the page number, the block number and the frame number in the block. These numbers are included in the RTC signal, and are stored in the receiving station. Therefore, comparing the numbers in the RTC signal to those in the station, the receiving station can check whether there are any error frames. If there are, the flow advances to step S128 to inform the other station of the ID numbers of the error frames. If not, the flow advances to step S132 to check whether the receiving station needs the flow control. If it does, the flow goes to step S134 to send the flow instruction signal to the other station via the backward channel. If it does not, the flow goes to step S140.

After sending the flow instruction signal, the control circuit checks whether the flow control is unnecessary or not, e.g., by checking whether this station has recorded all received image data, in step S136. If it has, the receiving station sends the flow release signal to the other station via the backward channel to release the flow control at the transmitting side.

In step S140, after the flow control, the receiving station sends the end detecting signal to the other station via the backward channel to show that the receiving station detects the end signal of one block.

Then the control circuit 40 checks whether there will be a next block in step S142, and if there will be, the control circuit 40 further checks if there is a mode change in step S146. If there is no mode change, the flow returns to step S114 to receive the training signal to prepare the next block. But, if there is any mode change, the flow goes back to step S102 to execute the pre-communication procedure to set a new mode.

If there will not be a next block in step S142, the image communication is over and the flow goes back to the initial state of step S52.

Embodiment 2

In embodiment 1, when the transmitting station receives the ID number of an error frame from the receiving station via the backward channel, the transmitting station sends image data of the error frame immediately after the completion of sending the current frame data, and after the completion of sending the image data of the error frame the transmitting station resumes sending the next frame data of the current frame data.

In embodiment 2, however, the transmitting station may store the ID numbers of error frames until the completion of a one block transmission, and the transmitting station may retransmit the error frames at once after the completion of the one block transmission.

Embodiment 3

In embodiment 1, once the transmitting station starts to send the image data to the receiving station, the transmission is never interrupted until transmission of one block of image data, including the re-transmission, is over. In other words, during the transmission of one block of image data, there are no operations for communication procedure.

In embodiment 3, not only for one block, but for all the image data there are no operations for communication procedure. For example, after the training signal is received correctly by the receiving station, the transmitting station sends all the image data without interrupting the fast transmission of the image data and without a communication procedure. In this case, it is required to retransmit error frames when each block of image data is transmitted to correct errors. Also in this case, it is required for the receiving station to instruct the flow control to the transmitting station for each block.

Embodiment 4 In embodiment 1, the receiving station instructs or releases the flow control at the completion of a one block data transmission.

In embodiment 4, the receiving station may instruct or release the flow control at any time. For example, the receiving station may instruct the flow control at any time while receiving the image data in the HDLC format. The transmitting station starts the flow control after the transmission of the current image data, when the transmitting station receives the flow instruction signal. In the flow control, the transmitting station sends a series of flags. Upon detection of the flow releasing signal via the backward channel, the transmitting station advances to send the next frame data.

Embodiment 5

In embodiment 1, the transmitting station sends the series of flags during the flow control. In embodiment 5, however, the transmitting station may send other signals for the flow control instead of flags.

Embodiment 6

In embodiment 1, the receiving station informs the transmitting station of the failure to receive the training signal via the backward channel to instruct retransmission of the training signal when the receiving station fails to receive the training signal. In this case, it is assumed that a modem is used whose equalizer can not be adjusted while receiving the data when the station fails to receive the training signal.

In embodiment 6, however, assuming another modem is used whose equalizer can be adjusted during the data receiving operation, it is not required for the receiving station to send the training failure signal even though it fails to receive the training signal.

As mentioned in each embodiment of the present invention, the facsimile apparatus which can transmit image data in the HDLC format and has the error correction mode of full duplex communication is provided. The receiving station sends the ID number of an error frame while receiving the current image data via the backward channel to the transmitting station, and the transmitting station continues to transmit current image data of the current frame. Then the transmitting station sends the image data of the error frame following the image data of the current frame. In other words, the transmission of the image data is never interrupted until the transmission of at least one block of image data is completed, and there is no communication procedure during this transmission.

Thereby, even if there are any error frames, retransmission of error frames is executed but no communication procedure is carried out, so that the time to correct errors is extremely shortened compared to the conventional error correction mode.

When the transmitting apparatus detects that there is an error frame, the transmitting apparatus retransmits the error frame following the current frame.

Therefore, if the receiving station records the image data continuously to the last frame which has no errors, the receiving station need not require the flow control so many times, because the transmitting station retransmits the error frame immediately after the current frame.

For example, in the conventional error correction of half duplex communication, if there is an error at the early part of one block, the receiving station cannot start to record until an error frame having that error is retransmitted, and when the error frame is retransmitted there should be much data to be recorded. Therefore, many flow controls are required depending upon what kind of facsimile apparatus is used or upon how great the capacity of the memory is at the receiving station.

According to the above-described embodiments, the present invention is able to execute the flow control in full duplex communication, and is able to instruct the transmitting station to send a high speed signal (the training signal) even when the receiving station fails to receive the high speed signal without going back to the communication procedure.

Further, the receiving station detects the end of the block so that even if there is some delay by an error, both stations can keep full duplex communication completely at least during the transmission of one block.

Although particular embodiments of the present invention are herein disclosed for purposes of explanation, various modifications thereof, after study of this specification, will be apparent to those skilled in the art to which the invention pertains.

As explained above, the present invention provides an image communication method in which the receiving station can inform the other, transmitting station of an error frame via the backward channel in full duplex communication, and the transmitting station sends the error frame following the completion of sending the current image data without returning to the communication procedure. So that, the present invention can shorten the time required for image transmission.

What is claimed is:

1. An image communication method for sending image data from a transmitting station to a receiving station, comprising the steps of:
    detecting an error in sent image data at the receiving station;
    sending position data designating image data where the error occurred to the transmitting station via a backward channel of full duplex communication while the transmitting station sends image data;
    continuing to send current image data which is being sent when the position data is received by the transmitting station;
    resending the image data designated by the position data following sending of the current image data; and
    notifying the transmitting station via the backward channel that the receiving station has received a predetermined amount of the image data, wherein the transmitting station sends next image data in response to the notification.

2. An image communication method according to claim 1, further comprising an initial step of sending a training signal to train a communication line between the stations before sending image data.

3. An image communication method according to claim 2, further comprising the steps of:
    requesting resending of the training signal via the backward channel when the receiving station fails to receive the training signal, and resending the training signal in response to the request.

4. An image communication method according to claim 1, further comprising the steps of:
    following the sending of image data without error, requesting the transmitting station via the backward channel to stop sending the image data in order to allow the receiving apparatus to receive all the image data with certainty; and
    stopping sending of the image data in response to the request.

5. An image communication method according to claim 4, further comprising the steps of:
    sending a release request to the transmitting station via the backward channel for releasing said stopping step; and
    resuming sending of the image data in response to the release request.

6. An image transmitting apparatus, comprising:
    transmitting means for sending image data to a receiving station;
    means for receiving position data designating sent image data where an error has occurred at the receiving station via a backward channel of full duplex communication during sending of the image data by said transmitting means;
    means for controlling said transmitting means to continue sending current image data even while the position data is received by said receiving means;
    transmitting means for resending image data designated by the position data after said transmitting means finishes sending a predetermined amount of image data; and
    means for receiving a notice showing that the receiving station has received a predetermined amount of the image data, the notice being received via the backward channel from the receiving station, wherein said transmitting means sends next image data in response to the notice.

7. An image transmitting apparatus, according to claim 6, further comprising training signal sending means for sending a training signal to train a communication line to the receiving station before the sending of the image data by said transmitting means.

8. An image transmitting apparatus, according to claim 7, further comprising means for receiving a training signal request requesting sending of the training signal via the backward channel, wherein the training signal is sent to said apparatus when the receiving station fails to receive the training signal, and wherein said retransmitting means resends the training signal in response to the training signal request.

9. An image transmitting apparatus, according to claim 6, further comprising means for receiving a stop request from the receiving station via the backward channel for stopping sending of the image data, and means for stopping sending of the image data in response to the stop request.

10. An image transmitting apparatus, according to claim 9, further comprising means for receiving a release request from the receiving station via the backward channel for releasing the stopping of the sending of the image data, wherein said transmitting means resumes sending the image data in response to the release request.

11. An image apparatus, comprising:
means for receiving image data from transmitting station;
means for detecting an error among the image data received by said receiving means;
means for sending position data designating where the error has been detected by said detecting means to the transmitting station via a backward channel of full duplex communication;
means for controlling said receiving means to continue receiving the image data;
a memory for storing the image data received by said receiving means in a normal order of the image data itself; and
means for sending a notice showing that said image data receiving means has received a predetermined amount of the image data to the transmitting station via the backward channel, wherein the notice is a signal for causing the transmitting station to transmit the next image data.

12. An image receiving apparatus, according to claim 11, further comprising means for receiving a training signal for training a communication line from the transmitting station, and means for sending a training request when said training signal receiving means fails to receive the training signal via the backward channel to the transmitting station.

13. An image receiving apparatus, according to claim 11, further comprising means for sending a stop request to the transmitting station via the backward channel for stopping the transmission of the image data.

14. An image receiving apparatus, according to cl;aim 13, further comprising means for sending a release request to the transmitting station via the backward channel for releasing the stopping of the transmission of the image data.

* * * * *